(12) United States Patent
Neil et al.

(10) Patent No.: US 6,714,346 B1
(45) Date of Patent: Mar. 30, 2004

(54) METHOD AND APPARATUS FOR THZ RADIATION POWER ENHANCEMENT

(75) Inventors: George R. Neil, Williamsburg, VA (US); Gwyn P. Williams, Yorktown, VA (US)

(73) Assignee: Plastics Components, Inc., Miama, FL (US)

(*) Notice: Subject to any disclaimer, the term of this patent is extended or adjusted under 35 U.S.C. 154(b) by 0 days.

(21) Appl. No.: 10/387,922

(22) Filed: Mar. 13, 2003

(51) Int. Cl.⁷ .................................................. H01S 3/00
(52) U.S. Cl. ........................................................ 359/346
(58) Field of Search ........................................ 359/346

(56) References Cited

U.S. PATENT DOCUMENTS 6,144,679 A * 11/2000 Herman et al. ............... 372/21
6,239,866 B1 * 5/2001 Bromage et al. .......... 356/5.01
6,567,431 B2 * 5/2003 Tabirian et al. ................ 372/4

FOREIGN PATENT DOCUMENTS

GB          2350673 A   * 12/2000
WO     WO 03/014823 A1  *  2/2003

* cited by examiner

Primary Examiner—Mark Hellner

(57) ABSTRACT

A method and apparatus for enhancing the energy of THz radiation in the form of photon pulses comprising synchronously reflecting photon pulses using at least one pair of facing optical mirrors such that the reflected photon pulses encounter an electron bunch or another photon pulse travelling in the same direction and energy is transmitted from the electron bunch or the other photon pulse resulting in an increase in the energy of the reflected photon pulse.

8 Claims, 1 Drawing Sheet

METHOD AND APPARATUS FOR THZ RADIATION POWER ENHANCEMENT

The United States of America may have certain rights to this invention under Management and Operating contract No. DE-AC05-84ER 40150 from the Department of Energy.

FIELD OF THE INVENTION

The present invention relates to terahertz (THz) radiation and more particularly to methods and apparatus for the power enhancement of such radiation.

BACKGROUND OF THE INVENTION

The THz region (1 THz=33 cm$^{-1}$ or 4 meV) lies in the far infrared spectral range where conventional thermal sources are very weak. For example, a blackbody source at 2,000° K. provides less than 1 $\mu$W per cm$^{-1}$ of spectral power density for a typical spectroscopy application. A system for the production of multiwatt THz radiation is described in Nature, Vol. 420, Nov. 14, 2002, pp. 153–156. While the production of such high power THz radiation constitutes a significant step forward in the art, even further enhancement, i.e. increase in the THz radiation power for subsequent use in medical diagnostic, security and other similar applications would be highly desirable. Thus, the availability of a method and apparatus that permits increasing the energy of the THz pulse to a value higher than would be available from as single pulse, produced as described in the aforementioned "Nature" article, would be highly desirable.

OBJECT OF THE INVENTION

It is therefore an object of the present invention to provide a method and apparatus that permits enhancement of THz radiation to an energy level higher than that available from a single THz pulse.

SUMMARY OF THE INVENTION

According to the present invention there are provided a method and an optical mode based apparatus that permit enhancement of the energy level of THz radiation. Such an apparatus comprises a cavity defined by a pair of facing mirrors oriented to receive and reflect a THz radiation pulse derived from an electron beam comprising a series of short electron bunches such that the interval between subsequent electron pulses or bunches in the beam matches the time it takes for the optical mode (mirrors) to return a reflected THz photon pulse to its point of origin where it encounters a subsequent electron bunch acquiring energy therefrom. Enhancement of the THz radiation occurs through the encounter of the reflected THz radiation pulse and an incoming newly generated electron pulse with energy being transferred from the electron pulse to the THz radiation photon pulse. An apparatus comprising such a pair of facing mirrors that provides multiple reflection of photon pulses therebetween for several synchronized intervals and permits removal of the enhanced (higher energy) THz radiation is also described.

DETAILED DESCRIPTION

Figure 1:
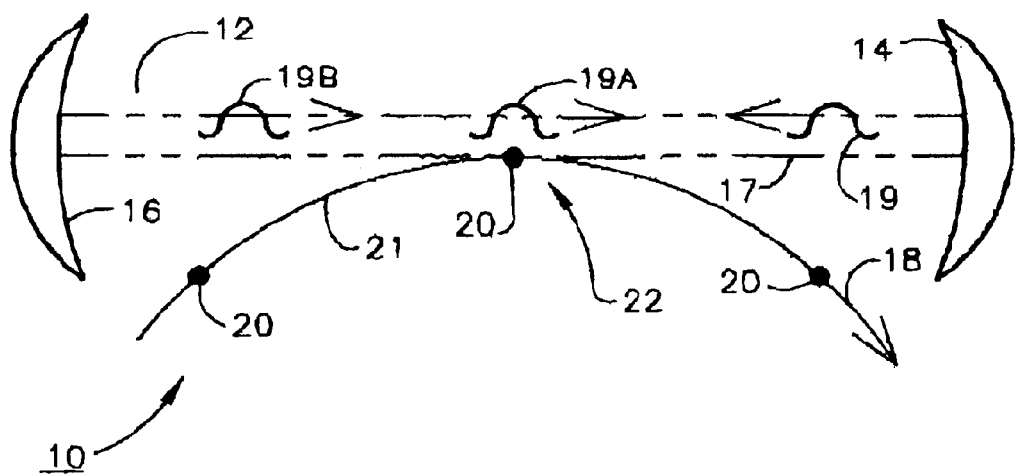
FIG. 1 is a schematic representation of one preferred embodiment of the THz radiation enhancement apparatus of the present invention.

Referring now to FIG. 1, the apparatus 10 of the present invention comprises a cavity defined by the volume 12 between a pair of mirrors 14 and 16. As is well known in the art, THz radiation is generated in an arcuate pattern 18 as photon pulses 19 are extracted from a high energy, short bunch electron beam 21 comprising a series of electron bunches or pulses 20. According to the present invention, as an electron pulses 20 reaches the apex 22 of its arcuate trajectory 18, photon pulse 19 is launched in the direction of mirror 14 along trajectory 17. Photon pulse 19 is reflected from mirror 14 toward mirror 16 as reflected photon pulse 19A. Photon 19A is then in turn reflected from mirror 16 back toward apex 22 as photon pulse 19B. Synchronizing the reflection of photons 19 such that the interval required for a launched photon to leave trajectory 18 at apex 22, be reflected from mirrors 14 and 16 and be reflected back to apex 22 equals the interval or some integral multiple of the interval between electron pulses 20, results in a reflected photon pulse 19B arriving at apex 22 at the same instant that a newly generated electron pulse 20 arrives at apex 22. This action results in a "reinforcement" or increase in the energy or power exhibited by photon pulse 19 (now photon pulse 19B) to yield a higher energy photon pulse that can be further circulated within cavity 12 or removed from the apparatus of the present invention and applied. Stated differently, through this relatively simple mechanism, energy from the incoming electron beam (as a short electron bunch) is imparted to the photons with which the electron bunch meets at apex 22 resulting in a the production of higher THz power. As will be apparent to the skilled artisan, although in the preferred embodiment depicted in FIG. 1, only two or a pair of mirrors are used to obtain the required reflection, a plurality of mirror pairs could be used to obtain the same result and such a configuration of multiple mirror pairs is clearly contemplated as within the scope of the appended claims.

Figure 2:
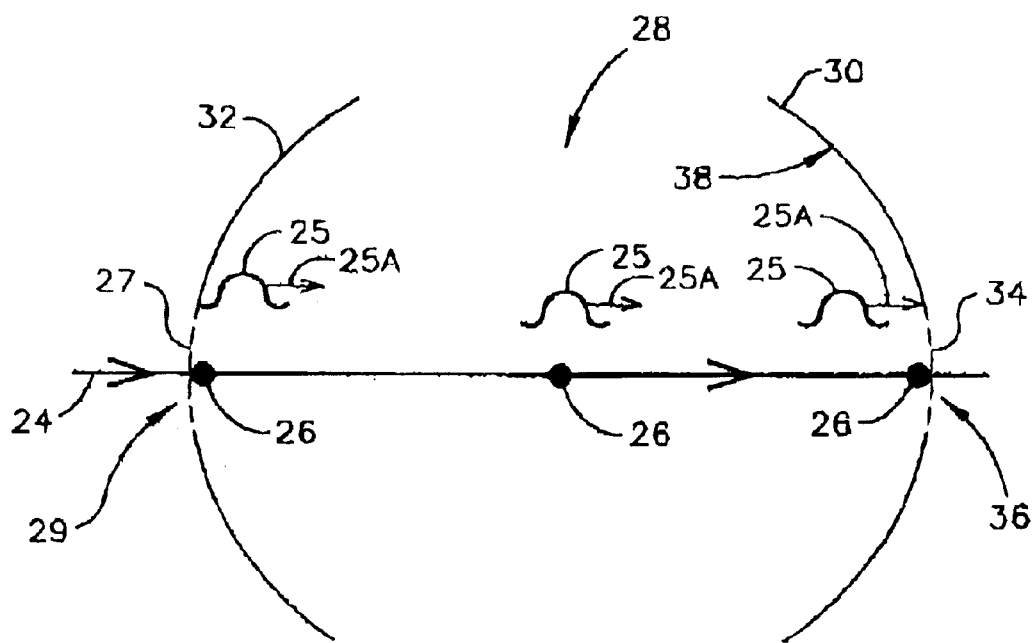
FIG. 2 is a schematic representation of a second preferred embodiment of the THz radiation enhancement apparatus of the present invention.

In the embodiment depicted in FIG. 2, enhancement or increase in photon beam power or energy is achieved through a somewhat different arrangement. In accordance with this embodiment, a photon pulse beam 24 comprising a series of photon pulses 26, also schematically shown in FIG. 2 as curves 25, produced externally to cavity 28 that is defined by a pair of facing photon reflecting mirrors 30 and 32 is introduced into cavity 28 through, for example, a one way mirror or other partially transmitting or reflecting mechanism 27 located in an aperture 29 in mirror 32. Photon pulses 26/25 produced by particle beam 24 impact mirror 32 from whence they are reflected back toward mirror 30, then from mirror 30 back toward mirror 32 etc. etc. until they are removed from cavity 28 through the use of a partially transmitting or reflecting mechanism 34 located across aperture 36 in mirror 30. In this case, synchronization of the reflected photons such that the interval required for first reflected photons 25 (moving in the direction indicated by arrows 25A) to reach, for example, the surface 38 of mirror 30 equals the interval or some integral multiple of the interval required for another incoming photon pulse 26 or second reflected photon pulse 25 to traverse the distance between mirrors 30 and 32 such that an incoming photon pulse 26 or a reflected photon pulse 25 arrives at surface 38 at precisely the same instant as a reflected photon pulse 25 resulting in a "reinforcement" or increase in the energy or power exhibited by photons 26 to yield higher energy photons, i.e. higher energy THz radiation, that is extracted from cavity 28 through a partially transmitting or reflecting mechanism 34 in mirror 30, controlled by a shutter or otherwise. Preferably mechanism 34 is swithchable. Through this relatively simple mechanism, higher energy THz radiation is produced. Since photons pass through each other with little or no interference, the system works in an extremely efficient manner. As will be apparent to the skilled artisan, while a single pair of mirrors is depicted in FIG. 2, a plurality of mirrors or mirror pairs that produce synchronized encounters of reflected photons with incoming photon pulses 26 and/or reflected photon pulses 25 would be equally useful and is intended to be within the scope of the appended claims.

There has thus been described a method and apparatus for the production of enhanced or higher power THz radiation. The apparatus is of relatively simple construction and can readily be designed and constructed by those skilled in the particle beam/photon transmission arts.

As the invention has been described, it will be apparent to those skilled in the art that the same may be varied in many ways without departing from the spirit and scope of the invention. Any and all such modifications are intended to be included within the scope of the appended claims.

What is claimed is:

1. A method for enhancing the energy of THz radiation in the form of photon pulses comprising:
   A) introducing THz radiation in the form of a beam of photon pulses into a cavity defined by at least one pair of facing optical mirrors; and
   B) reflecting said photon pulses to produce reflected photon pulses such that the interval required for one of the reflected photon pulses to traverse the distance between said beam of photon pulses, said at least one pair of mirrors and return to said beam of photon pulses equals the interval or some integral multiple of the interval between said photon pulses such that power from said photon pulses is imparted to said reflected photon pulse.

2. The method of claim 1 wherein said beam of photon pulses is introduced into said cavity through a partially transmitting or reflecting mechanism and enhanced THz radiation is removed from said cavity through a partially transmitting or reflecting mechanism in an aperture in the second of said pair of facing mirrors.

3. The method of claim 2 wherein said partially transmitting or reflecting mechanism is a switchable device.

4. Apparatus for enhancing THz radiation comprising:
   A) a mechanism for introducing THz radiation in the form of a beam of photon pulses comprised of a series of photon bunches and;
   B) a cavity defined by at least one pair of facing optical mirrors that produces reflected photon pulses when THz radiation is introduced into said cavity;
   said cavity providing synchronous reflection of photon pulses such that the reflected photon pulses encounter another photon pulse travelling in the same direction and energy is transmitted from said other photon pulse to said reflected photon pulse resulting in an increase in the energy of said reflected photon pulse.

5. The apparatus of claim 4 wherein said beam of photon pulses is introduced into said cavity through a one-way photon permeable mechanism in an aperture in one of said pair of facing mirrors and enhanced THz radiation is removed from said cavity through a mechanism in an aperture in the second of said pair of facing mirrors.

6. The apparatus of claim 5 wherein said partially transmitting or reflecting mechanism is a switchable device.

7. Apparatus for enhancing THz radiation comprising:
   A) a mechanism for producing an arcuate electron beam comprised of a series of short bunches of electrons and defining an apex in said arcuate electron beam at which THz radiation comprised of a series of photon bunches is produced; and
   B) a cavity defined by at least one pair of facing optical mirrors that produces reflected photon pulses within which said arcuate electron beam and said apex are located;
   said cavity providing synchronous reflection of photon pulses such that the reflected photon pulses encounter a short bunch of electrons travelling in the same direction and energy is transmitted from said short bunch of electrons to said reflected photon pulse resulting in an increase in the energy of said reflected photon pulse.

8. A method for enhancing the energy of THz radiation in the form of photon pulses comprising:
   A) introducing an arcuate electron beam comprised of a series of short bunches of electrons into a cavity defined by at least one pair of facing optical mirrors such that an apex in said arcuate beam is defined; and
   B) reflecting photon pulses, THz radiation, produced from said arcuate electron beam at said apex between said at least one pair of mirrors to produce reflected photon pulses and such that the interval required for one of the reflected photon pulses to traverse the distance between said apex, said at least one pair of mirrors and return to said apex equals the interval or some integral multiple of the interval between said short electron bunches such that power from said electron bunches is imparted to said reflected photon pulse.

* * * * *